July 5, 1938.  F. T. HAFEN  2,122,840
GAUGE FOR PIPE CORES
Filed Nov. 11, 1936
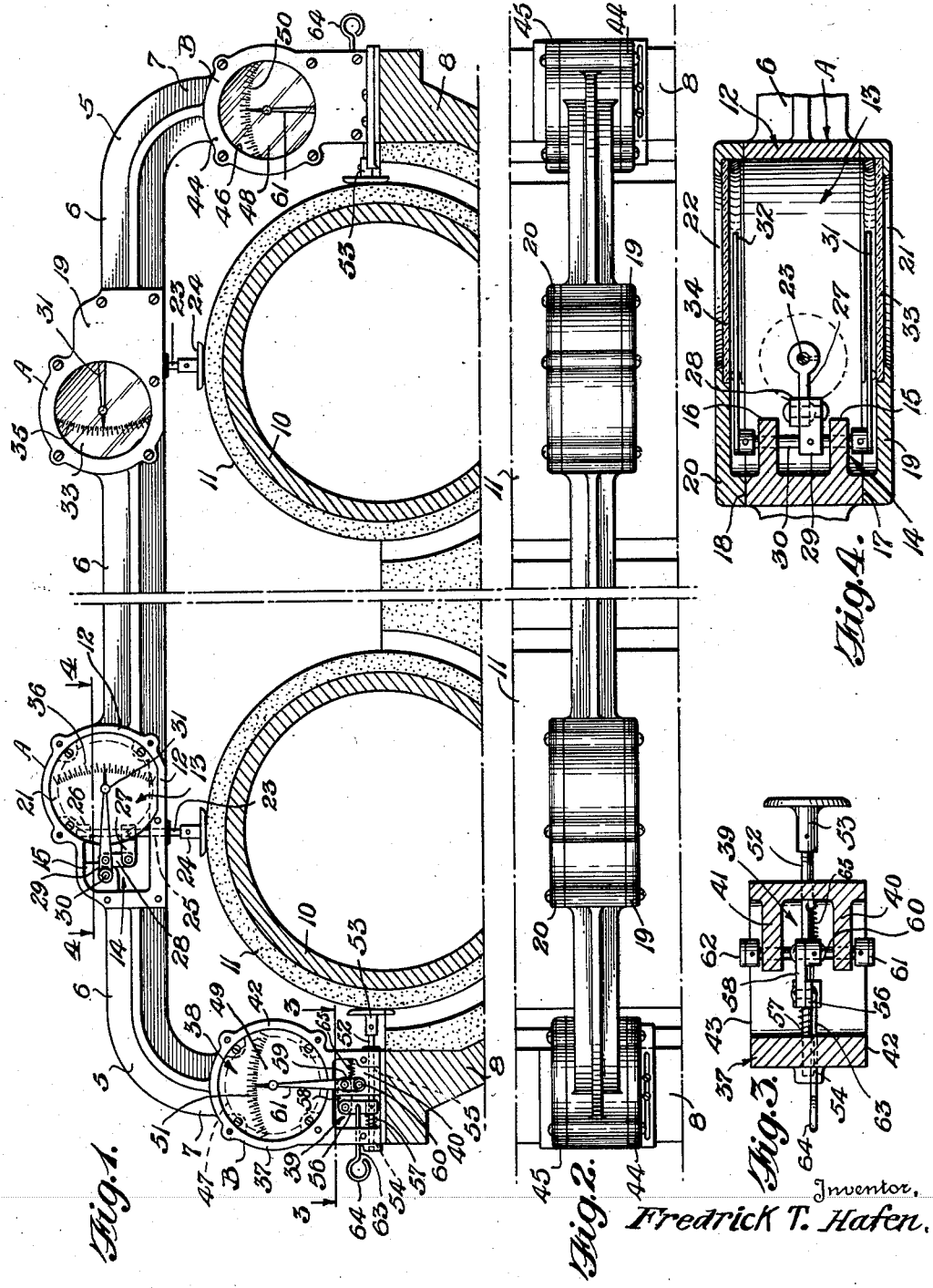
Inventor,
Fredrick T. Hafen.
By J. George Tate
Attorney Patented July 5, 1938

2,122,840

UNITED STATES PATENT OFFICE 2,122,840

GAUGE FOR PIPE CORES

Fredrick T. Hafen, Provo, Utah, assignor to McWane Cast Iron Pipe Co., Birmingham, Ala.

Application November 11, 1936, Serial No. 110,409

8 Claims. (Cl. 33—180)

This invention pertains to new and useful improvements in gauges generally, but more particularly to those types of gauges used in measuring deflections of cores employed in the manufacture of cast iron pipes.

In the casting of pipe it is necessary to set the cores on the drag section of the flask in such a manner that there is a small downward deflection of the core to compensate for the upward flotation effect of the molten metal when poured, and at the same time it is necessary that there should not be any lateral deflection of the core. In order to fulfill these requirements it is necessary to make use of deflection gauges to obtain accurate measurements in the setting of the core.

The principal object of my invention is to provide gauges which will measure simultaneously vertical and horizontal deflections in cores used in the manufacture of cast iron pipe.

Another object is to have the dials of both gauges readable by a workman from the same point of view.

In accordance with my invention one gauge is mounted vertically and is used in the setting of the vertical deflection to a predetermined amount, and another gauge is mounted horizontally and is used to indicate any lateral deflection of the core. These gauges are used only as indicating means in order that the pipe when cast will be of substantially uniform thickness. In order that the proper degree of accuracy be obtained it is desirable to have the gauges mounted upon a common frame and with the center lines of the indicator-actuating plungers disposed in perpendicular relation.

With these and other objects in view which will more fully appear, the nature of the invention will be more clearly understood by following the description, the appended claims, and the several views illustrated in the accompanying drawing.

In the drawing:

Fig. 1 is an elevation of a gauge device constructed in accordance with my invention, Fig. 2 is a top plan view thereof, Fig. 3 is a section taken on line 3—3 of Fig. 1, and Fig. 4 is a section taken on line 4—4 of Fig. 1.

Referring to the drawing in detail, a substantially inverted U-shaped gauge frame 5 having a horizontal bar 6 and vertical end arms 7, 7 is so constructed as to span the drag 8 of the flask upon the metal edges of which it rests. The drag 8 supports core bars 10, 10 having the usual sand cores 11, 11. Mounted upon and forming a part of the horizontal bar 6 are two dial gauges A, A which are located above the cores and in vertical planes containing the longitudinal axes thereof. The end arms 7, 7 are respectively provided with dial gauges B, B which are located in substantially the horizontal plane containing the transverse axes of the cores 11, 11.

Inasmuch as the actuating mechanisms of the gauges A, A are identical, a description of one of them will be sufficient.

Each gauge A is defined by a casing 12 which is cast integral with the horizontal frame bar 6, and comprises a dial chamber 13 and an operating chamber 14 which is located at one side of and in open communication with the dial chamber. Located within the chamber 14 and integral with the bar 6 are two spaced lugs 15, 16 which extend toward the chamber 13. The chambers 13, 14 have flat open front and rear faces 17, 18 which are adapted to be closed by removable cover plates 19, 20. The cover plates 19, 20 are provided with view openings 21, 22 which conform to the shape of the dial chamber 13 and are in register therewith. A vertical rod 23 having a foot piece 24 is positioned intermediate the chambers 13 and 14, and is slidably mounted in spaced upper and lower bearings 26, 25 in the dial casing 12. A lateral arm 27 is fixed to the rod 23 and extends into the chamber 14. A transverse rock shaft 30 is journalled in the lugs 15, 16 with the ends of the shaft protruding beyond the lugs. A relatively short arm 29 is rigidly attached to the shaft 30 and extends toward the dial chamber 13. The arm 29 is disposed between the lugs 15, 16 and above the arm 27. A vertical link 28 is pivotally connected at its upper end to the outer end of the arm 29, and is pivotally connected at its lower end to the outer end of the arm 27. Removably attached to the ends of the shaft 30 are relatively long indicating fingers 31, 32 which extend beyond the arm 29 and into the dial chamber 13. The fingers 31, 32 are disposed immediately within the cover plates 19, 20, and in register with the view openings 21, 22 thereof. Any vertical movement of the foot piece 24 will result in an increased movement of the indicating fingers 31, 32 due to the connections therebetween. The dial cover plates 19, 20 are provided with transparent dial faces 33, 34 having marked graduated scales 35, 36 across which the outer ends of the indicating fingers 31, 32 oscillate.

After the cores are set in the drag of the flask and the gauge frame 5 is set into place, each gauge A is operated as follows:—

The face of the foot piece 24 is held in contact with the core 11 by the force of gravity. Any vertical deflection of the core, either upwardly or downwardly, will cause a movement of the rod 23 which will be transmitted through the multiplying connections 27, 28 etc. to the indicating fingers 31, 32 which move across the scales 35, 36 thus giving duplicate readings of the vertical deflection of the core 11.

Inasmuch as the actuating mechanisms of the gauges B, B are identical, a description of one of them will be sufficient.

Each gauge B is defined by a casing 37 which is cast integral with the vertical arm 7, and comprises a dial chamber 38 and an operating chamber 39 which is located below and in open communication with the dial chamber. Located within the chamber 39 and integral the vertical arm 7 are two spaced lugs 40, 41. The chambers 38, 39 have flat open front and rear faces 42, 43 which are adapted to be closed by removably mounted cover plates 44, 45. These dial cover plates 44, 45 are provided with view openings 46, 47 which conform to the shape of the dial chamber 38 and are in register therewith. Mounted in the openings 46, 47 are transparent dial faces 48, 49 upon which are marked graduated scales 50, 51. A horizontal rod 52 is positioned within and adjacent the lower end of the chamber 39, and is slidably mounted in spaced left and right bearings 54, 55 in the dial casing 37. The inner end of the rod 52 projects inwardly through the dial casing 37 and supports a foot piece 53. A vertical arm 56 is rigidly attached to the rod 52 and extends toward the chamber 38. Interposed between the arm 56 and the outer wall of the chamber 39 is a helical spring 57 which is mounted in coaxial relation to the rod 52. The pressure of the spring 57 holds the foot piece 53 in contact with the surface of the core 11. A rock shaft 60 is journaled in the lugs 40, 41 with the ends of the shaft protruding beyond the lugs. A relatively short rock arm 59 which is rigidly attached to the shaft 60, extends toward the dial chamber 38 and is disposed between the lugs 40, 41 and is located at one side of the arm 56. Removably attached to the ends of the shaft 60 are relatively long indicating fingers 61, 62 which extend beyond the arm 59 into the dial chamber 38. The fingers 61, 62 are disposed immediately within the cover plates 44, 45 and in register with the view openings 46, 47 thereof. The outer ends of the fingers 61, 62 oscillates across the scales 50, 51 on the dial faces upon any movement of the foot piece 53. Any horizontal movement of the foot piece 53 will result in an increased movement of the indicating fingers 61, 62 due to the connections therebetween. A pull rod 63, rigidly attached at its inner end to the arm 56, is slidably mounted in a bearing in the outer wall of the chamber 39. The pull rod 63 extends outwardly from the outer wall of the chamber 39, and is provided at its outer end with an eye 64. The pull rod is used to move the rod 52 outwardly when the gauge frame 5 is set into place whereby the foot piece 53 will be kept clear of the surface of the core 11, thus preventing any loss of sand from the core by being knocked.

A coil spring 65 is interposed between the arm 59 and the inner wall of the chamber 39 and functions to take up all lost motion between the fingers 61, 62 and the foot 53.

After the cores are set in the drag of the flask and the gauge frame 5 is set into place, the dial gauge B functions as follows:—

The face of the foot piece 53 is held in contact with the surface of the core 11 by the pressure of the helical spring 57. Any lateral deflection of the core, either to the right or left, will cause a corresponding movement of the rod 52 which is transmitted through the multiplying connections to the indicating fingers 61, 62 which move across the scales 50, 51 thus giving a duplicate reading of the lateral deflection of the core 11. It is to be noted that the rods 23 and 52 of the cooperative gauges A and B are disposed in relatively perpendicular planes.

Through the use of the gauging device, two gauging operations on a core can now be enacted where formerly only one gauging operation could be accomplished. Heretofore only vertical deflections of the cores were measured, and this means that the workman had to rely upon his ability and sense of judgment to prevent any horizontal deflection. There was always the possibility that in setting the cores to the proper vertical deflection the workman would inadvertently set the cores with a slight horizontal deflection also. The result was that the pipe, when cast, was not of uniform thickness throughout its length. However, by my invention, through the use of two gauges upon a single frame, each gage acts to record deflection and both gauges can be compared simultaneously to furnish an extremely accurate recording of the set up of the cores in the flask. These gauges have a further advantage in that they are readable by the workman from a single position and from either face of the device.

It is of course to be understood that the details of structure and arrangement of parts may be variously changed and modified without departing from the spirit and scope of my invention.

I claim:

1. In a core gauging device, the combination with the drag of a flask, of a gauge frame supported on said drag and including vertical and horizontal arms adapted to partially surround a core supported on the drag, and a pair of gauges respectively mounted on said arms and including operating followers movable by the core in planes at right angles to each other to indicate simultaneously the lateral and vertical deflections of the core.

2. In a core gauging device, the combination with the drag of a flask, of a gauge frame supported on said drag and including vertical and horizontal arms adapted to partially surround a core supported on the drag, and a pair of gauges respectively mounted on said arms and respectively including spring actuated and gravity actuated followers movable by the core in planes at right angles to each other to thereby indicate simultaneously the lateral and vertical deflections of the core.

3. In a core gauging device, the combination with the drag of a flask, of a gauge frame supported on said drag and including vertical and horizontal arms adapted to partially surround a core supported on the drag, and a pair of gauges respectively mounted on said arms and respectively including spring actuated and gravity actuated followers movable by the core in planes at right angles to each other to thereby indicate simultaneously the lateral and vertical deflections of the core, one of the followers being gravity operated in a vertical plane, the other follower being spring operated in a horizontal plane.

4. In a core gauging device, the combination with the drag of a flask, of an inverted substantially U-shaped gauge frame supported on said drag and including vertical and horizontal arms adapted to partially surround a core supported on the drag, and a pair of gauges respectively mounted on said arms and respectively including spring actuated and gravity actuated followers movable by the core in planes at right angles to each other to thereby indicate simultaneously the lateral and vertical deflections of the core.

5. In a core gauging device, a vertical frame arm adapted to be mounted on a drag at one side of a core supported on the drag, and a gauge mounted on the vertical arm and including a horizontal spring operated follower movable into contact with the core, and a manually operable and horizontally slidable pull rod connected to the follower for retracting the latter, said rod extending in a direction away from the core.

6. In a core gauging device, a vertical frame arm adapted to be mounted on a drag at one side of a core supported on the drag, and a gauge mounted on the vertical arm and including a pair of dials secured to opposite faces of the vertical arm, a foot piece for contacting the side of said core, a horizontally slidable follower rod secured to the foot piece, a horizontal rock shaft mounted in the vertical arm, an arm secured at one end to the follower rod, a spring interposed between said arm and the outer wall of the frame arm, a link pivoted to the other end of said arm, a rock arm secured to the rock shaft and pivotally connected with said link, and indicating fingers fixed to the rock shaft and movable over the faces of said dials.

7. In a core gauging device, a vertical frame arm adapted to be mounted on a drag at one side of a core supported on the drag, and a gauge mounted on the vertical arm and including a pair of dials secured to opposite faces of the vertical arm, a foot piece for contacting the side of said core, a horizontally slidable follower rod secured to the foot piece, a horizontal rock shaft mounted in the vertical arm, an arm secured at one end to the follower rod, a spring interposed between said arm and the frame arm, a link pivoted to the other end of said arm, a rock arm secured to the rock shaft and pivotally connected with said link, indicating fingers fixed to the rock shaft and movable over the faces of said dials, and a manually operable and horizontally slidable pull rod connected to the follower rod for retracting the latter, said rod extending in a direction away from the core.

8. In a core gauging device, the combination with the drag of a flask, of a vertical frame arm mounted on said drag at one side of a core supported on the drag, and a gauge mounted on the vertical arm and including a pair of dials secured to opposite faces of the vertical arm, a foot piece for contacting the side of said core, a horizontally slidable follower rod secured to the foot piece, a horizontal rock shaft mounted in the vertical arm, an arm secured at one end of the follower rod, a spring interposed between said arm and the outer wall of the frame arm, a link pivoted to the other end of said arm, a rock arm secured to the rock shaft and pivotally connected with said link, a coil spring interposed between the rock arm and the inner wall of the frame arm, and indicating fingers fixed to the rock shaft and movable over the faces of said dials.

FREDRICK T. HAFEN.